United States Patent
Weber (10) Patent No.: US 9,547,616 B2
(45) Date of Patent: Jan. 17, 2017

(54) HIGH BANDWIDTH SYMMETRICAL STORAGE CONTROLLER

(71) Applicant: DataDirect Networks, Inc., Chatsworth, CA (US)

(72) Inventor: Bret S. Weber, Wichita, KS (US)

(73) Assignee: DataDirect Networks, Inc., Chatsworth, CA (US)

( * ) Notice: Subject to any disclaimer, the term of this patent is extended or adjusted under 35 U.S.C. 154(b) by 458 days.

(21) Appl. No.: 14/184,064

(22) Filed: Feb. 19, 2014

(65) Prior Publication Data

US 2015/0234766 A1    Aug. 20, 2015

(51) Int. Cl.
*G06F 13/40* (2006.01)
*H04L 12/933* (2013.01)

(52) U.S. Cl.
CPC ......... *G06F 13/4022* (2013.01); *H04L 49/101* (2013.01); *H04J 2203/0016* (2013.01)

(58) Field of Classification Search
CPC .. H04L 49/101; H04L 49/1576; H04L 49/106; H04L 2012/561; G06F 13/4022; H04J 2203/0016; H04Q 2011/0058; H04Q 2213/04; H04Q 3/0004
See application file for complete search history.

(56) References Cited

U.S. PATENT DOCUMENTS

| | | | | |
|---|---|---|---|---|
| 2010/0125653 | A1* | 5/2010 | Cherian | G06F 13/4004 709/223 |
| 2014/0040677 | A1* | 2/2014 | Matsui | G06F 11/1666 714/54 |
| 2014/0059266 | A1* | 2/2014 | Ben-Michael | G06F 13/385 710/313 |

* cited by examiner

*Primary Examiner* — Farley Abad
(74) *Attorney, Agent, or Firm* — Russell T. Manning; Marsh Fischmann & Breyfogle, LLP (57) ABSTRACT

Provided herein are systems, apparatuses and methods (i.e., utilities) that allow for increasing the bandwidth of a processing complex of a storage controller. The utilities utilize a symmetrical approach where PCIe switches overcome limitations of prior art processor complexes. The symmetrical approach provided by the disclosed utilities as incorporated into a storage controller provides equal access from any host path/channel to any drive path/channel (i.e., storage element). More specifically, a first or a first set of PCIe switches connect front-end PCIe host bus adaptors, which are connectable to host systems, to front-end data paths of a plurality of PCIe memory controllers. A second or second set of PCIe switches connect backend host bus adapters, which are connectable to storage elements, to back-end data paths of the plurality of PCIe memory controllers. The symmetrical architecture provides at least twice the bandwidth of prior art architectures.

17 Claims, 8 Drawing Sheets

HIGH BANDWIDTH SYMMETRICAL STORAGE CONTROLLER

FIELD OF THE INVENTION

This disclosure relates to data storage in a data storage system and an improved architecture and method for transferring data between a high performance computing system and a data storage system.

BACKGROUND

High Performance Computing (HPC) systems, sometimes referred to as supercomputers, typically include a plurality of compute nodes each having one or more processing units or cores. More typically, such HPC systems include hundreds or even thousands of cores that may be distributed across a network or placed in a close proximity to one another (e.g., in a computer cluster). Such HPC systems are used for a wide range of computationally intensive applications in various fields, including, without limitation, quantum mechanics, weather forecasting, climate research, oil and gas exploration, molecular modeling and physical simulations.

The multiple compute nodes of a HPC system typically operate independently and periodically output information in a burst output mode. The burst output is typically stored to enterprise level storage architectures. One current storage approach for HPC systems is to provide a storage architecture (e.g., parallel file system) that provides enough bandwidth to sustain a 100% duty cycle burst (i.e., simultaneous burst of all compute nodes). This is to ensure that write bandwidth is available when the compute nodes are ready to dump accumulated computations. This approach provides a brute force solution by using hundreds of, for example, conventional block storage machines behind a parallel file system. One factor requiring the use of such a large number of block storage machines is the limited bandwidth (e.g., maximum data input rate) of the block storage machines. That is, the processor complexes of such storage machines are typically limited to bandwidths of 10 GB/s to 40 GB/s as limited by the current de-facto processor architecture, typically, produced by Intel Corporation. This bandwidth limitation requires large numbers of the storage machines to accommodate the output of an HPC system. The volume of storage machines required to provide the necessary bandwidth causes many infrastructure problems, including management logistics, mean time between failure (MTBF) issues, power infrastructures and cabling.

SUMMARY

Provided herein are systems, apparatuses and methods (i.e., utilities) that allow for increasing the bandwidth of a processing complex of a storage controller. The utilities utilize a symmetrical approach where PCIe switches overcome limitations of prior art processor complexes. More specifically, prior art storage controller have often required that data accesses be routed between two or more processor complexes, which puts many restrictions on mapping and accesses. The symmetrical approach provided by the disclosed utilities, as incorporated into a storage controller, provides equal access from any host path/channel to any drive path/channel (i.e., storage element). More specifically, a first or a first set of PCIe switches connect front-end PCIe host bus adaptors, which are connectable to host systems, to a front-end data paths of a plurality of PCIe memory controllers. A second or second set of PCIe switches connect backend host bus adapters, which are connectable to storage elements, to back-end data paths of the plurality of PCIe memory controllers. The symmetrical architecture provides at least twice the bandwidth of prior art architectures.

In one aspect, a storage controller is provided having a set of four PCIe memory controllers each having a PCIe front-end path (ingress/egress), a PCIe back-end path (ingress/egress) and a set of memory modules where the PCIe memory controllers are symmetrically connected by a PCIe crossover switch. The PCIe crossover switch includes one or more front-end PCIe switches having a first plurality of PCIe lanes connected to one or more front-end host bus adaptors, which are connectable to one or more host paths/systems. A second plurality of PCIe lanes are connected to each of the PCIe front-end paths of the PCIe memory controllers. In order to provide full bandwidth from any host path to any PCIe memory controller, the total number of PCIe lanes connected to each of the PCIe front-end paths of the PCIe memory controllers is at least equal to an total number of PCIe lanes connected to any of the front-end PCIe host bus adapters. The crossover switch further includes one or more back-end PCIe switches having a first plurality of PCIe lanes connected to one or more back-end PCIe host bus adaptors. A second plurality of PCIe lanes are connected to each of the PCIe back-end paths of the PCIe memory controllers. In this regard, any host path connected to any of the front-end host bus adaptors is connectable to any drive path connected to any of the back-end host bus adapters via a single PCIe memory controller. A processor of the storage controller is operative to schedule data into the memory modules of each of the PCIe memory controllers and to/from storage elements connected to the back-end host bus adaptors. This processor is operative to spread data evenly over the PCIe memory controllers to increase overall bandwidth of the storage controller.

In one embodiment, each of the PCIe memory controllers includes a PCIe×16 front-end path and a PCIe×16 back-end path. In this embodiment, the PCIe crossover switch includes first and second 96 lane PCIe front-end switches. Each of the 96 lane PCIe front-end switches include 32 PCIe lanes connected to one or more front-end host bus adapters, 32 PCIe lanes connected to the front-end path of two of the four PCIe memory controllers and 32 PCIe lanes connected to the other 96 lane PCIe front-end switch. Likewise, the back-end PCIe switch include first and second 96 lane PCIe back-end switches where each switch includes 32 PCIe lanes connected to one or more back-end host bus adapters, 32 PCIe lanes connected to the back-end path of two of the four PCIe memory controllers and 32 PCIe lanes connected to the other 96 lane PCIe back-end switch. Such an arrangement provides full bandwidth between any host path/channel and any PCIe memory controller as well as full bandwidth between any drive path/channel and any PCIe memory controller.

In various embodiments, the PCIe memory controllers are formed of field programmable gate arrays (FPGAs). In such an embodiment, the FPGAs may include data paths, control paths, PCIe controllers and PCIe registers. In another embodiment, the PCIe memory controllers are single socket CPUs. In such an embodiment, the memory modules, PCIe connections of the single socket CPU and custom code are utilized to perform the functions of the PCIe memory controllers. In this embodiment, one or more cores of one or more of the single socket CPUs may form the processor of the storage controller.

DETAILED DESCRIPTION

While the presented inventions are susceptible to various modifications and alternative forms, specific embodiments of the inventions have been shown, by way of example, in the drawings and will herein be described in detail. Those skilled in the art will appreciate that the features described below can be combined in various ways to form multiple variations of the inventions. As a result, the inventions are not limited to the specific examples described below, but only by the claims and their equivalents.

High Performance Computing (HPC) systems, sometimes referred to as supercomputers, generate large volumes of data, which is typically stored to one or more enterprise level storage architectures (i.e., "storage systems"). Typically, the storage systems are designed to meet high bandwidth requirements of the HPC systems. Further, such storage systems are subjected to bursty I/O patterns as the HPC system alternates between computationally dominant and I/O dominant phases. During computationally dominant phases, the storage systems may experience reduced bandwidth requirements. In contrast, during I/O dominant phases, the bandwidth requirements of the storage system may significantly increase. In theory, it is desirable to utilize a storage system (e.g., parallel file system) that will provide enough bandwidth to sustain all output of the HPC system during I/O dominant phases. In such an arrangement, all data output by the HPC system may be simultaneously stored to storage media without blocking or waiting for data to be stored. However, providing the necessary bandwidth to accommodate data output during I/O dominant phases of an HPC system typically require numerous (e.g., hundreds) storage systems each having potentially hundreds of storage devices. Accordingly, it has been recognized by the present inventor that increasing the bandwidth of the storage systems would allow for reducing the number of storage systems required to accommodate the output of a HPC system.

Figure 1:
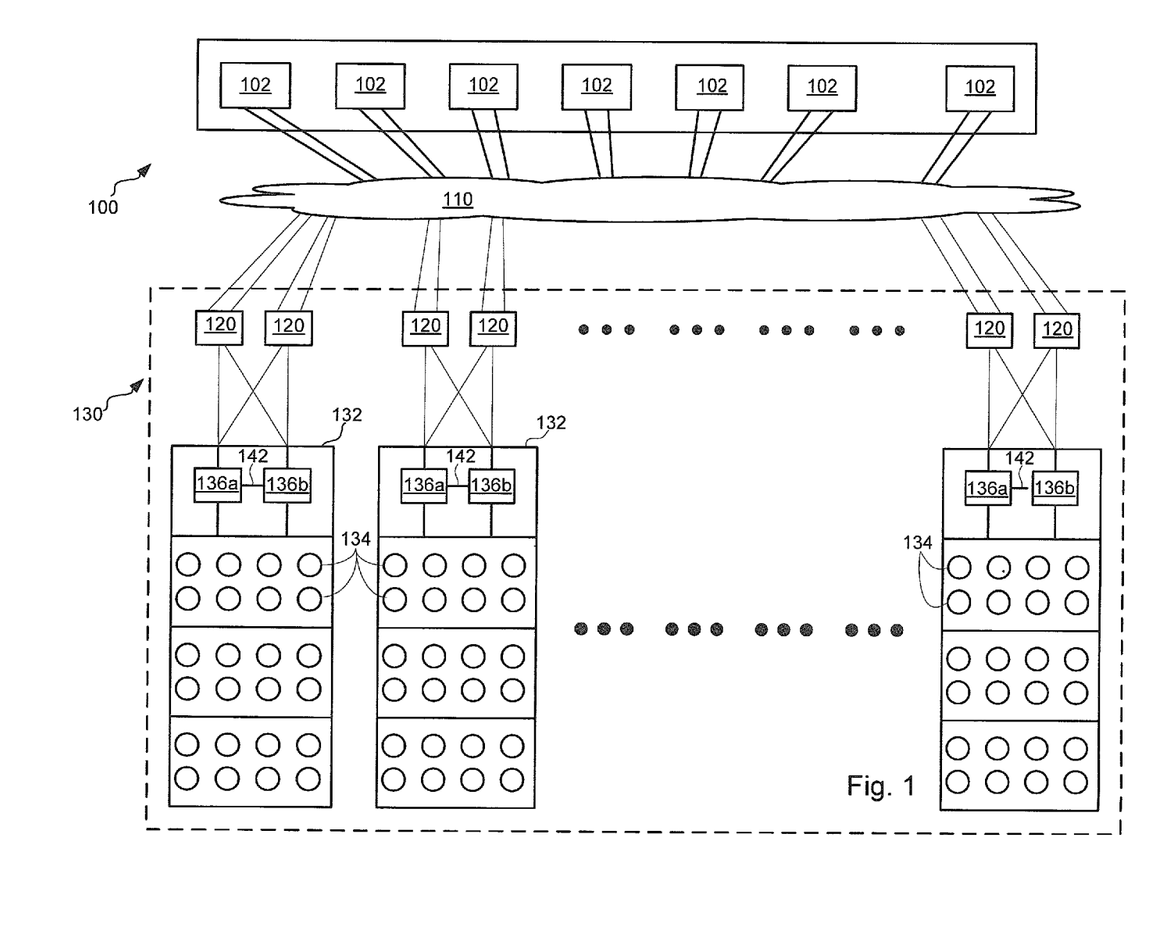
FIG. 1 illustrates a HPC system connected to a parallel storage system.

FIG. 1 is a block diagram of an exemplary architecture in which aspects of the presented inventions may be implemented. The exemplary architecture includes a HPC system 100 including numerous compute nodes 102 connected to a parallel file system 130 via a High Speed Interconnect (HSI) 110). The parallel file system 130 includes a plurality of individual block storage devices or storage subsystems 132 and a plurality of object storage servers 120. It will be appreciated that other configurations are possible. For instance, the object storage servers may be replaced by other host systems and various switches/switching fabrics and/or traditional non-parallel file systems may be incorporated into the architecture.

In the illustrated embodiment, the HPC system is interconnected to the object storage servers 120 via the High Speed Interconnect (HSI) 110. The HSI 110 may conform to the INFINIBAND, CASCADE, GEMINI, ETHERNET or other architecture (e.g., optical fiber technology). The HSI 110 may be standard or proprietary. The HPC system 100 includes a plurality of computing nodes 102. Each computing node has at least one core and may have multiple cores, such as 2, 4, 8, 32, etc. The computing nodes may be in one or more racks, shelves or cabinets, or combinations thereof. The total number of nodes is dependent on the configuration of the HPC system 100.

The parallel file system 130 may be deployed in shared-disk or shared-nothing distributed parallel mode. The parallel file system 130 includes multiple independent storage subsystems 132. Each storage subsystem 132 typically includes two or more controllers 136a, 136b as well as a plurality of individual storage devices 134. The storage subsystems 132 may be separated geographically, may be in the same location, may be in separate racks, may be in separate buildings on a shared site, may be on separate floors of the same building, and arranged in other configurations.

The storage subsystems 132 are configured for handling I/O requests from the object storage servers or other host systems. The object storage servers or "host systems" 120 may be communicatively connected to the storage subsystems 132 for processing I/O requests through a variety of connections. Examples of such connections include Fibre Channel (FC), Small Computer System Interface (SCSI), Internet SCSI (ISCSI), Ethernet, Infiniband, SCSI over Infiniband, piping, and/or various physical connections. A variety of well-known operating systems may be employed in such computing environments depending upon the needs of particular users and enterprises. In addition, the storage subsystems 132 are operative to communicate with one another. Such communication may occur over various networks including, without limitation, local area networks, wide area networks, or a combination of these and may include wire lines, optical fiber cables, wireless communication connections, and others. Accordingly, such a network may include networking devices such as routers, hubs, switches and the like. The storage subsystems 132 may augment or enhance the capabilities and functionality of the parallel file system by promulgating policies, tuning and maintaining the system, and performing other actions.

Each of the storage subsystems 132 includes a plurality of individual storage devices 134 such as rotating media/disks and/or other types of storage devices (e.g., solid state drives, optical storage, tape storage, semiconductor storage, magnetic tape, or other similar storage media). Such storage devices or media may be arranged according to any of a variety of techniques including one or more logical units (LUNs). One exemplary storage subsystem is set forth in co-owned U.S. patent application Ser. No. 13/804,116, the entire contents of which is incorporated herein by reference. The storage systems can be configured to employ any of a number of storage management schemes, such as a RAID storage management system (e.g., Raid 0, 5, 6 etc.). However, the presented embodiments are not limited to RAID configurations or any particular RAID configuration.

The storage devices 134 may be of the same capacity, may have the same physical size, and may conform to the same specification, such as, for example, a hard disk drive specification. Example sizes of storage devices include, but are not limited to, 2.5" and 3.5". Example hard disk drive specifications include Serial Attached Small Computer System Interface (SAS), Serial Advanced Technology Attachment (SATA), Ethernet, PCIe and others. In some embodiments, the physical size of the media in the storage devices may differ.

The storage devices 134 may be included in a single cabinet, rack, shelf or blade. When the storage devices 134 are included in a single cabinet, rack, shelf or blade, they may be coupled with a backplane. The controllers 136a, 136b (hereafter 136 unless specifically referenced) may be included in the cabinet, rack, shelf or blade with the storage devices. The backplane may be coupled with or include the controller(s). The controllers 136 may communicate with and allow for communications with the storage devices 134 according to a storage media specification, such as, for example, a hard disk drive specification. The controllers 136 may include one or more processors, volatile memory and non-volatile memory.

The rack, shelf or cabinet containing the storage devices may include a communications interface that allows for connection to other storage devices, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and LLINK®), Fibre Channel, Ethernet, WiFi (also known as IEEE 802.11), SAS and SCII. The backplane or controller in a rack or cabinet containing storage devices may include a network interface chip, chipset, card or device that allows for communication over a wired and/or wireless network.

The storage subsystems 132 may additionally provide for one or multiple kinds of storage replication and data resiliency. The data storage systems described herein may operate as a fully replicated distributed data storage system in which all data is replicated such that all copies of stored data are available from and accessible. Replication may be performed synchronously, that is, completed before the write operation is acknowledged; asynchronously, that is, the replicas may be written before, after or during the write of the first copy; or a combination of each. This configuration provides for a high level of data resiliency.

In the present embodiment, each of the storage subsystems 132 includes a pair of storage controllers 136a, 136b for processing I/O requests. Each of the controllers is operatively connectable with each of the individual storage devices 134 to affect such read/write requests (connections are not shown for purposes of clarity). The system may also utilize redundant connections between each host system 120 and storage subsystem 132. That is, dual path architecture may be utilized to provide redundant paths to provide failover protection.

The use of the dual storage controllers 136a, 136b in each of the storage subsystems 132 increases the bandwidth of the storage subsystems and increases the availability of the storage subsystems (e.g., due to failure of one controller). Accordingly, the pair of controllers 136a, 136b can access the same storage devices 134. Further, memories of each of the controllers communicate with one another to ensure that they are synchronized. In this regard, I/O requests are mirrored in the memory of each controller. That is, if a first controller 136a receives an I/O request, this I/O request is stored in memory of the first controller and mirrored (e.g., copied) to memory of the second controller 136b, for example, via an Inter-controller Channel 142 (ICL) physically interconnecting the controllers 136a, 136b a write-back cache may be utilized by the storage controllers. In this arrangement, when one storage controller (e.g., controller 136a) receives a request to write data to the storage devices 134, this data is stored in a write cache (e.g., DRAM) of the controller 136a and mirrored in the write cache of the second controller 136b. At this time, a command-complete signal can be returned to the requesting host indicating that the write operation is complete. In some implementations, such a command complete signal may be sent before the data is actually written to the storage devices 134, as a back-up copy exists in the memory of the second controller 136b. In such an arrangement, if one controller experiences a failure, the other controller may continue processing I/O requests.

One limiting factor in the transfer of data between the HPC and the parallel file system is the bandwidth of the storage subsystem controllers 136. That is, it has been recognized by the inventor that such controllers are typically limited by the bandwidth of their processor complexes. Specifically, the ingress and egress bandwidth of the processor complex as well as the memory bandwidth of the processor complex limits the maximum data transfer rates of the controllers.

Figure 2:
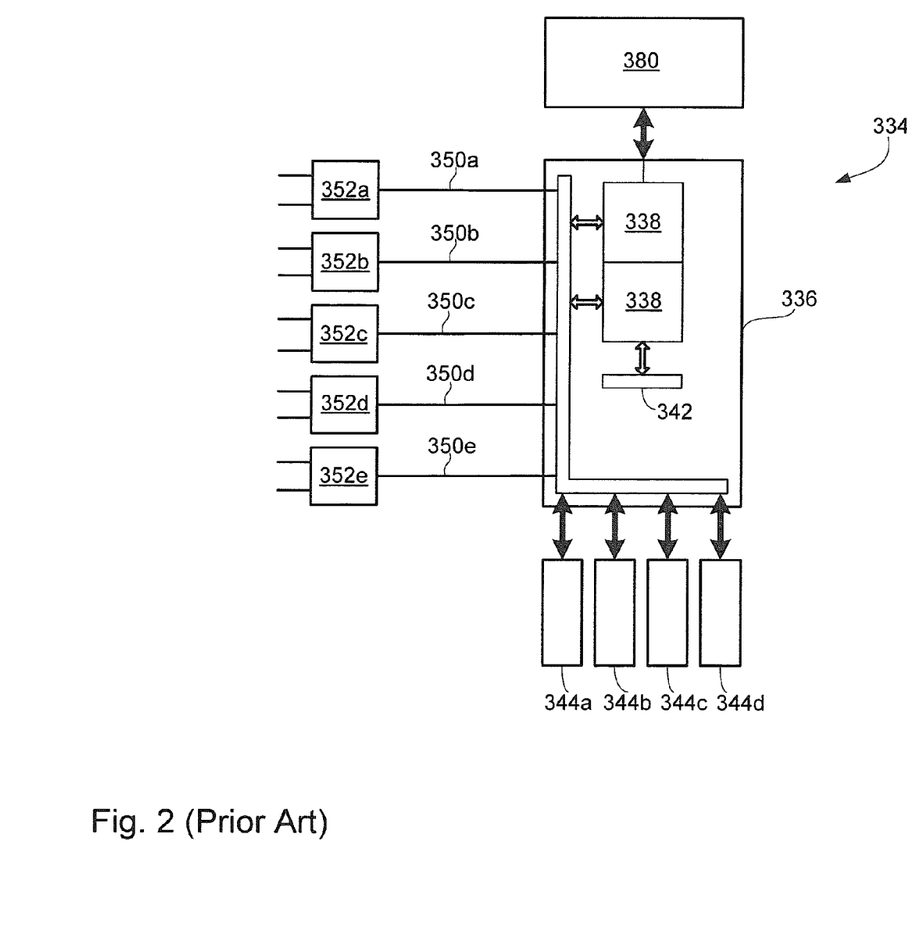
FIG. 2 illustrates one embodiment of a prior art single socket storage controller.

FIG. 2 illustrates what is commonly referred to as a single socket CPU 336. This single-socket CPU 336 is currently the de-facto building block of enterprise level storage system controllers. Such a single socket CPU 336 is commercially available from Intel Corporation of Santa Clara, Calif. under the brand names of Sandy Bridge and Ivy Bridge. The bandwidth of the single socket CPU 336 is limited by the bandwidth of the two PCIe slots of its front-end interface, as more fully discussed below. Assuming a 6.4 GB/s transfer rate for PCIe×8 Gen 3 slots, the input bandwidth of a storage controller having a single socket CPU 336 with two front-end PCIe slots is around 12 GB/s (i.e., two PCIe×8 slots). In a storage subsystem having two controllers (i.e., two CPU sockets), this results in a bandwidth of approximately 24 GB/s. Accounting for computational overhead, such a system is typically considered to have a bandwidth of around 20 GB/s.

As shown, the single socket CPU 336 is utilized in a processor complex 334. The single socket CPU 336 includes one or more cores 338, a bus 340, internal memory 342 and four channels of external memory 344a-d (e.g., DRAM). The single socket CPU 336 further includes five PCIe×8 slots 350a-e for a total of 16 lanes in and 24 lanes out of the processor complex 334. Specifically, two of the PCIe×8 slots 350a, 350b are utilized as ingress/egress ports connectable with host systems (i.e., front-end interfaces). The front-end interface slots 350a, 350b each receive a host bus adaptor 352a, 352b, which allows the processor complex 334 to communicate with host systems through a variety of means, including, without limitation, FC, SCSI, SCSI ISCSI, SAS, PCIe, Ethernet, Infiniband, SCSI over Infiniband, piping, and/or various physical connections. The host bus adaptors 352 may comprise one or more individual circuits or chips (e.g., ASICs). Three of the PCIe×8 slots 350c, 350d and 350e are utilized as back-end interfaces that are connectable with storage devices. Accordingly, each of the back-end interface slot 350c-e is adapted to receive a PCIe configured host bus adaptor 352c-e that allows the processor complex 334 to communicate with storage devices via any of a number of back-end protocols including, without limitation SAS, SATA, SCSI, Ethernet, PCIe, and FC. Various functionality of the controller may be augmented via an external Platform Controller Hub (PCH) 380 in the case of Intel® microprocessors. Such a PCH 380 may provide various ancillary functionality including, without limitation, support logic, real time clock, interface logic for specific storage devices, etc.

To increase the bandwidth of the single socket CPU, a dual socket CPU is sometimes utilized. See FIG. 3. In such an arrangement, two single socket CPUs 336a, 336b are interconnected by one or more point-to-point processor interconnects 360. One point-to-point processor interconnect utilized with such commercially available single socket CPUs 336 is the Intel QuickPath Interconnect (QPI). The result of utilizing a dual socket CPU is that the number of PCIe slots available for the front-end interface is doubled resulting in 32 lanes into the processing complexes 334a and 334b. That is, the second single socket CPU 336b provides two additional front-end interface slots 370a, 370b each of which receive a PCIe host bus adaptor 372a, 372b and three back-end interface slots 370c-e each of which receive a PCIe host bus adaptor 372c-e. In addition, the second single socket CPU 336b includes a second set of memory 374a-d. In this regard, the bandwidth of a dual socket CPU, with the above noted assumptions, is around 24 GB/s for a single controller and around 48 GB/s for a dual controller storage subsystem. Accounting for computational overhead, such a system is typically considered to have a bandwidth of around 40 GB/s. Further, it is theoretically possible to interconnect four sockets together to increase bandwidth to near 80 GB/s. However, the point-to-point processor interconnects result in certain inefficiencies in dual or quad socket designs. Further, quad socket designs are typically cost prohibitive on a price per GB/s basis. That is, CPU sockets designed for incorporation into a quad socket design are often two to three times as expensive as a single socket CPU. Accordingly, the increased cost of the CPU sockets designed for quad or other multiple socket designs has limited the implementation of such designs.

Figure 3:
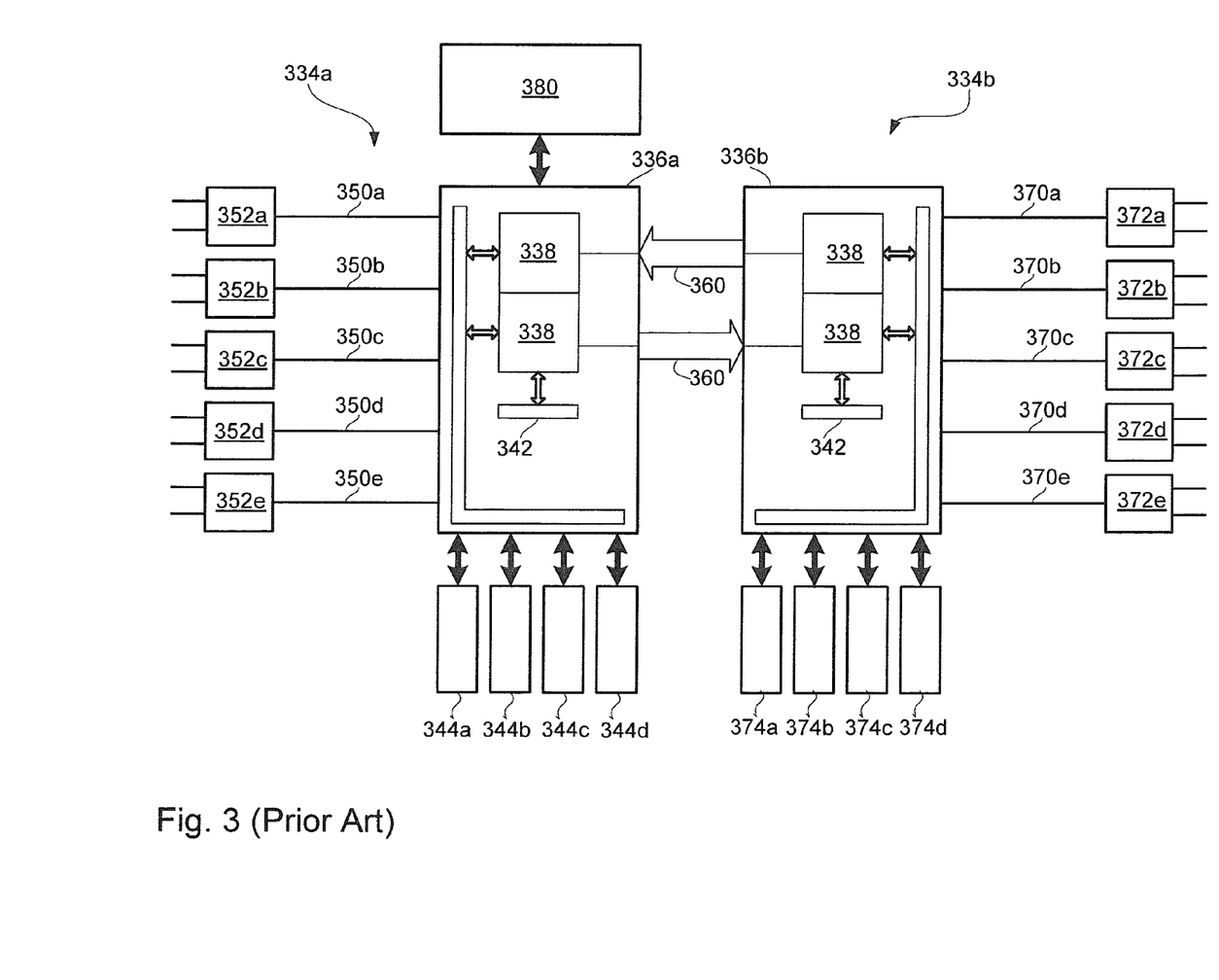
FIG. 3 illustrates one embodiment of a prior art dual socket storage controller.

As illustrated in FIG. 3, the connection of two single socket CPUs 336a, 336b by one or more point-to-point interconnects 360 requires that a host system connected to a front-end host bus adaptor (e.g., 352a) of the first single socket CPU 336a and attempting to access a storage device connected to a back-end host bus adaptor (e.g., 372e) connected to the second single socket CPU 336 be routed through the processor complexes 334a, 334b of both sockets 336a, 336b to access the specified storage device. That is, such data access requires a host channel to go from one processing complex to the other, which puts a number of restrictions on mapping and access. In quad socket architectures, the host channel may have to access three processing complexes to access a specific storage device. Regardless of the configuration of a multiple socket CPU, the host channels do not have direct access to all of the storage devices.

Figure 4:
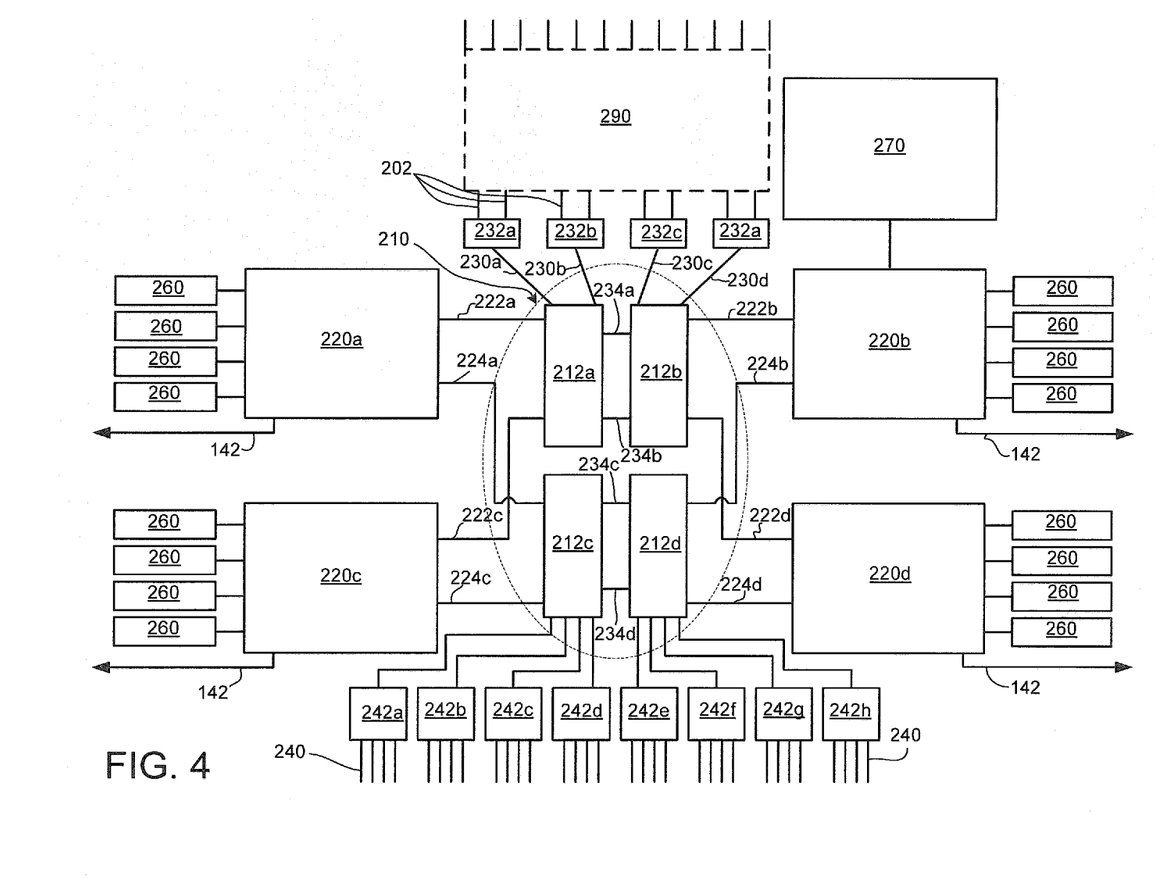
FIG. 4 illustrates one embodiment of a high bandwidth storage controller.

FIG. 4 illustrates one embodiment of a high bandwidth storage controller 136 that alleviates a number of the issues inherent to prior art multiple socket CPUs storage controllers. Specifically, the inventive storage controller 136 utilizes a symmetrical approach that allows each host channel 202 to have direct access to each of multiple memory controllers 220a-d. This allows each host channel to have equal access to any storage device connected to the drive channels 240 of the storage controller 136. In order to provide such access, the present storage controller utilizes a number of PCIe switches 212a-d and multiple PCIe-based memory controllers 220a-d that allow data to be spread evenly, which increases overall bandwidth. Further, the presented architecture provides at least twice the bandwidth of the prior art architectures.

The storage controller 136 utilizes a crossbar switch arrangement 210 to interconnect 64 PCIe host channels/lanes and 64 PCIe drive channels/lanes via four memory controllers 220a-d (hereafter 220 unless specifically referenced). In the illustrated embodiment, the crossbar switch arrangement 210 includes four 96 lane PCIe switches 212a-d (hereafter 212 unless specifically referenced). These switches 212 allow for directly connecting any of the PCIe host channels/lanes 202 to any of the PCIe drive channels/lanes 240 via a single memory controller 220.

In the illustrated embodiment, the crossbar switch utilizes two 96 lane PCIe switches 212a and 212b (e.g., front-end switches) to connect four sixteen lane PCIe channels/lanes 230a-d to the ingress/egress paths 222a-d (i.e., front-end ingress/egress paths) of the four memory controllers 220a-d. In such an arrangement, four PCIe×16 slots are populated by host bus adaptors 232a-d. Specifically, two PCIe×16 host bus adaptors 232a, 232b populate slots in the first switch 212a and two PCIe×16 host bus adaptors 232c, 232d populate slots in the second switch 212b. These host bus adaptors 232 may be configured for any appropriate front-end protocol including FC, Ethernet, SAS, Infiniband, etc. In addition, the host bus adaptors 232 may be connected to merchant switch silicon 290 if desired. The first and second switches 212a and 212b are each connected to two of the memory controllers. Specifically, switch 212a is connected to memory controllers 220a and 220c via front-end ingress/egress paths 222a and 222c, respectively. Likewise, switch 212b is connected to memory controllers 220b and 220d via front-end ingress/egress paths 222b and 222d, respectively. These connections may be made via traces or standard PCIe connectors. The two switches 212a, 212b are coupled to one another via two PCIe×16 paths 234a and 234b. In other embodiments, other PCIe connections (e.g., four PCIe×8 connections) may be utilized. Coupling the front-end switches 212a, 212b together provides full bandwidth from any PCIe channel/lane to any memory controller simultaneously.

The second set of switches 212c and 212d (e.g., back-end switches) connect the back-end ingress/egress paths 224a-d of the four memory controllers 210a-d to the drive channels 240. Specifically, the third switch 212c connects to the back-end ingress/egress paths 224a, 224c of memory controllers 220a and 220c while the fourth switch 212d connects to the back-end ingress/egress paths 224b, 224d of memory controller 220b and 220d. Again each of these connections utilizes a PCIe×16 connection. As with the first and second switches 212a, 212b, the third and fourth switches 212c, 212d are connected to one another via two PCIe paths 234c and 234d. Finally, the third and fourth switches 212c and 212d are, in the present embodiment, each connected to four PCIe×8 output channels/lanes. Specifically, in the illustrated embodiment, four PCIe×8 host bus adaptors 242a-d populate slots in the third switch 212c and four PCIe×8 host bus adaptors 242e-h populate slots in the fourth switch 212d. In other embodiments, differently configured host bus adaptors may be utilized (e.g., four PCIe×16, etc.). In any embodiment, the back-end PCIe host bus adaptors may be configured for any of a number of back-end protocols including, without limitation SAS, SATA, Ethernet, PCIe, and FC.

In the illustrated embodiment, the storage controller 136 provides 64 PCIe host channels/lanes and 64 PCIe drive channels/lanes where any of the host channels/lanes may be connected to any of the drive channels/lanes via a single memory controller 220. Further, in the illustrated embodiment, which utilizes four PCIe×16 front-end ingress/egress PCIe channels/lanes 230a-d each having a bandwidth of approximately 12.8 GB/s, the controller has 64 input channels/lanes with an input bandwidth of approximately 48 GB/s. Further, use of 8 PCIe×8 back-end channels/lanes (or equivalent), each having a bandwidth of approximately 6.4 GB/s, provides 64 output channels/lanes with an output bandwidth of approximately 48 GB/s. Accounting for computational overhead, such a controller 136 has a I/O bandwidth of approximately 40 GB/s. In a dual controller system having first and second controllers 136a, 136b (See FIG. 5), the bandwidth is approximately 80 GB/s. That is, the controller has approximately twice the bandwidth of prior art storage controllers.

Figure 5:
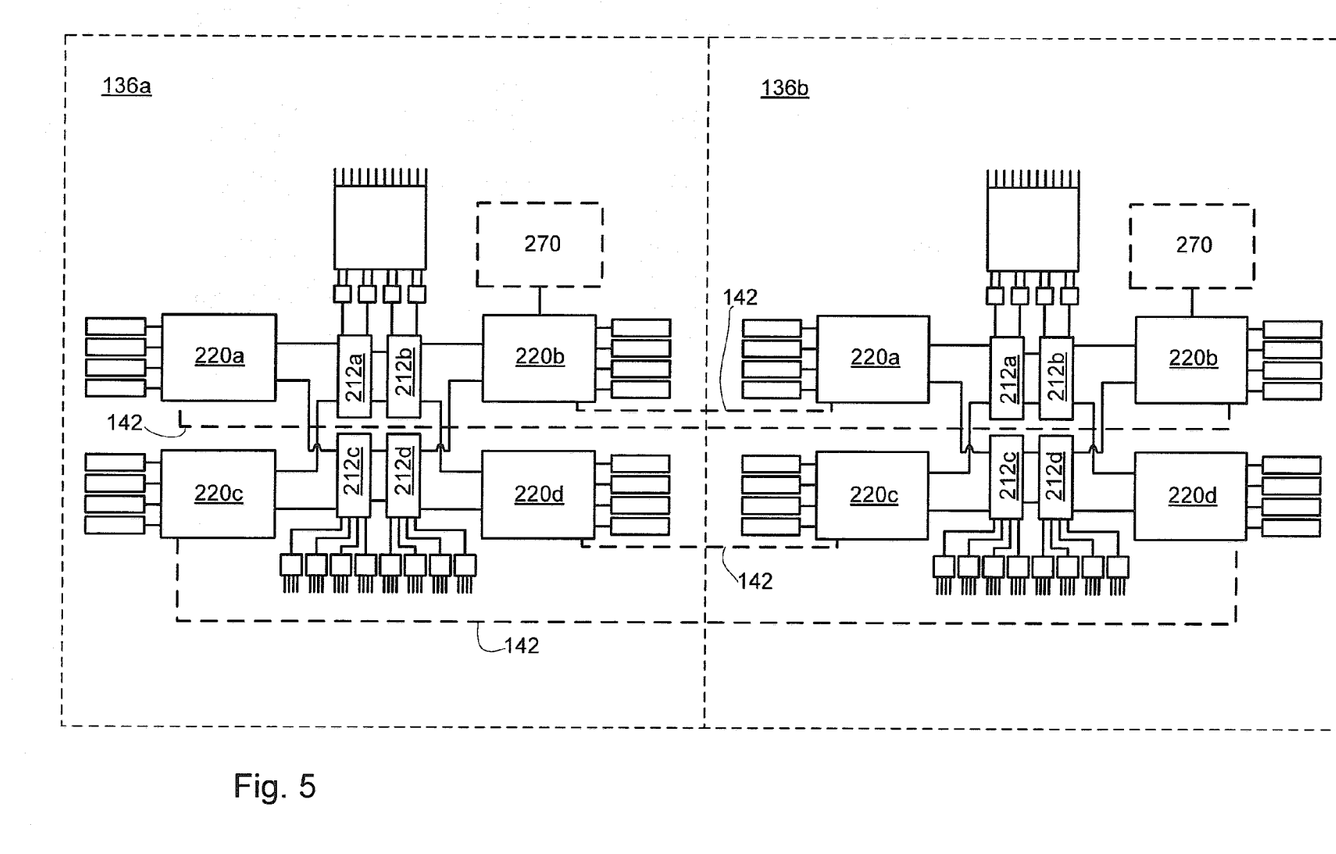
FIG. 5 illustrates one embodiment of two high bandwidth storage controllers coupled together.
Figure 6:
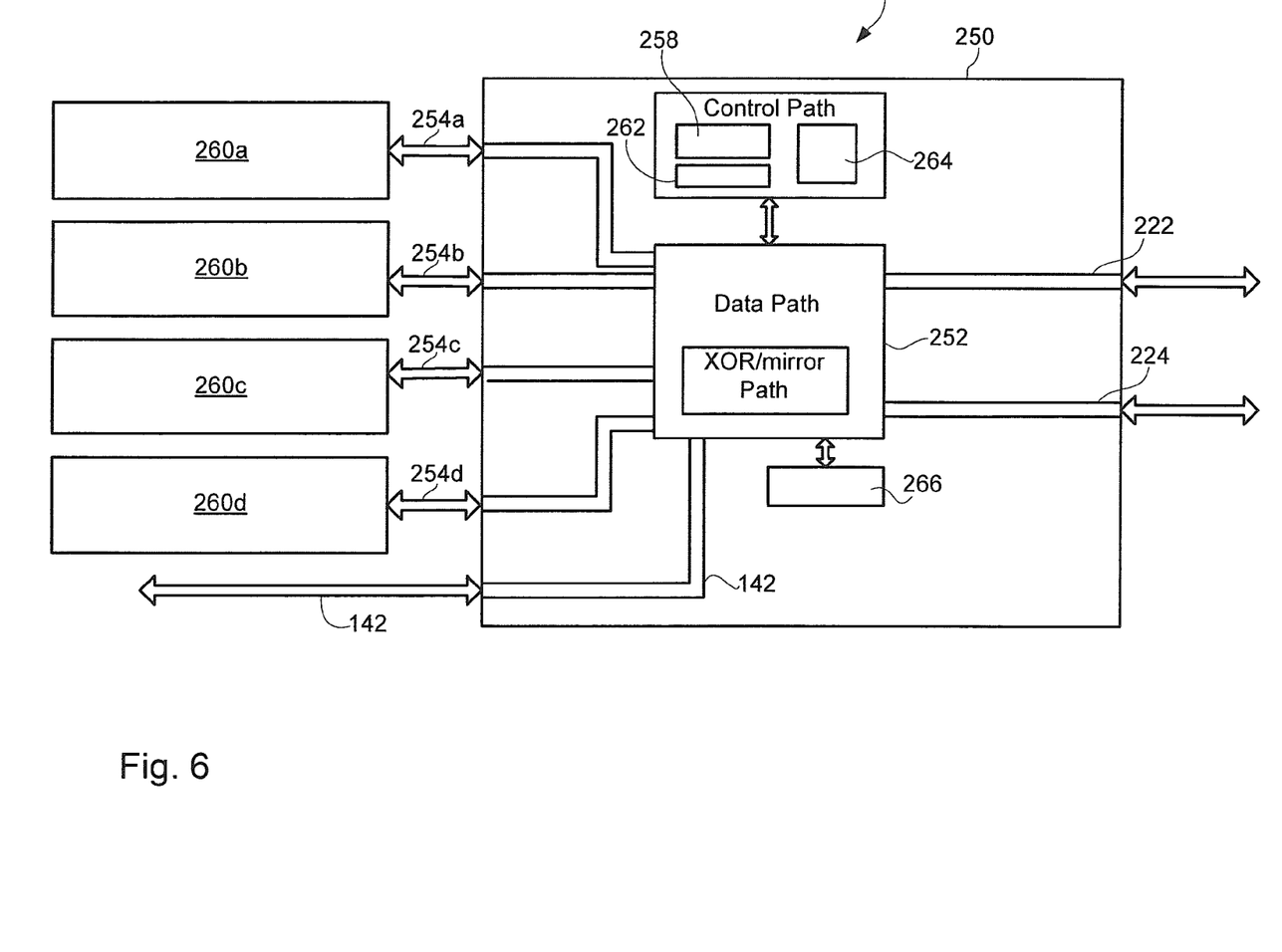
FIG. 6 illustrates one embodiment of a memory controller.

FIG. 6 illustrates one embodiment of a memory controller 220 that may be utilized with the storage controllers 136 of FIGS. 4 and 5. As shown, the memory controller 220 includes a field programmable gate array (FPGA) 250 having a data path 252 connected to a front-end PCIe×16 ingress/egress path/slot 222 and a back-end PCIe×16 ingress/egress path/slot 224. The data path 253 of the FPGA 250 is also, in the illustrated embodiment, connected to four memory slots 254a-d that are adapted to receive memory modules 260a-d, which may include, without limitation, DRAM, NVDIMMS and UlltraDIMM®. The memory modules 260a-d may be volatile, with or without battery back-up, or nonvolatile. Preferably, the bandwidth of the memory modules 260a-d is in excess of the bandwidth of the front-end ingress/egress slot 222 to accommodate parity and/or read-modify-write operation. Accordingly, the bandwidth of the memory modules 260a-d may be significantly in excess of the bandwidth of the front-end ingress/egress path 222 to provide redundancy/parity functionality. In this regard, data received by the memory controller 220 may be readily stored within the memory modules 260a-d without blocking or waiting. In one embodiment, each of the memory modules has a bandwidth of 15 GB/s. However, this is not a requirement.

The data path 252 of the FPGA 250, in the present embodiment, is interconnected to the front-end and back-end slots via PCIe×16 connectors. The FPGA 250 may further include a control path 256, which may include a PCIe controller 258 which supports logic to operate the memory controller 220. The control path 252 may further include a memory module controller 262 and PCIe registers 264, which map the PCIe memory of the memory modules 260a-d. Additionally, the data path 252 may provide parity calculations (e.g., XOR) using, in the present embodiment, an XOR memory 266 such that receive data is stored with redundancy. More commonly, the data is directly written to the memory modules 260a-d in a DMA process and the data is then retrieved from the memory modules such that parity calculations may be made. Once parity is calculated, the data and calculated parity may be written back to the memory modules. Further, the memory controller 220 includes a data forking path or ICL 142 that allows any data destined for the memory modules to be simultaneously copied to a secondary redundant controller without any additional memory cycles. Referring briefly to FIG. 5, it is noted that the various ICLs 142 of the first and second storage controllers 136a, 136b are interconnected to provide such redundancy.

Referring again to FIG. 4, the overall operation of the storage controller 200 is described. In the illustrated embodiment, a separate processor 270 manages the data transfers among the memory controllers. Upon receiving an I/O command (e.g. write request) from a host system, the processor schedules the data to be written to the memory modules 260 of one or more of the memory controllers 220a-d. In order to spread the I/O data evenly, the processor 270 will alternate the memory controller used to store the data. In this regard, the processor may implement a hash algorithm/map or other distribution scheme (e.g., round robin) to allocate received data to the memory controller(s) 220a-d. Accordingly, the crossbar switch 210 connects the appropriate host channel to the front-end ingress/egress path 222 of the appropriate memory controller 220 such that the data may be transferred to the allocated memory controller 220. That is, the received data is mapped to PCIe memory space transparently. In the present embodiment, Direct Memory Access may be incorporated into the front-end host bus adaptors 232a-d and/or the back-end host bus adaptors 242a-h such that the data is both transferred to the appropriate memory controller and directly written to allocated locations in the memory modules 260.

Figure 7:
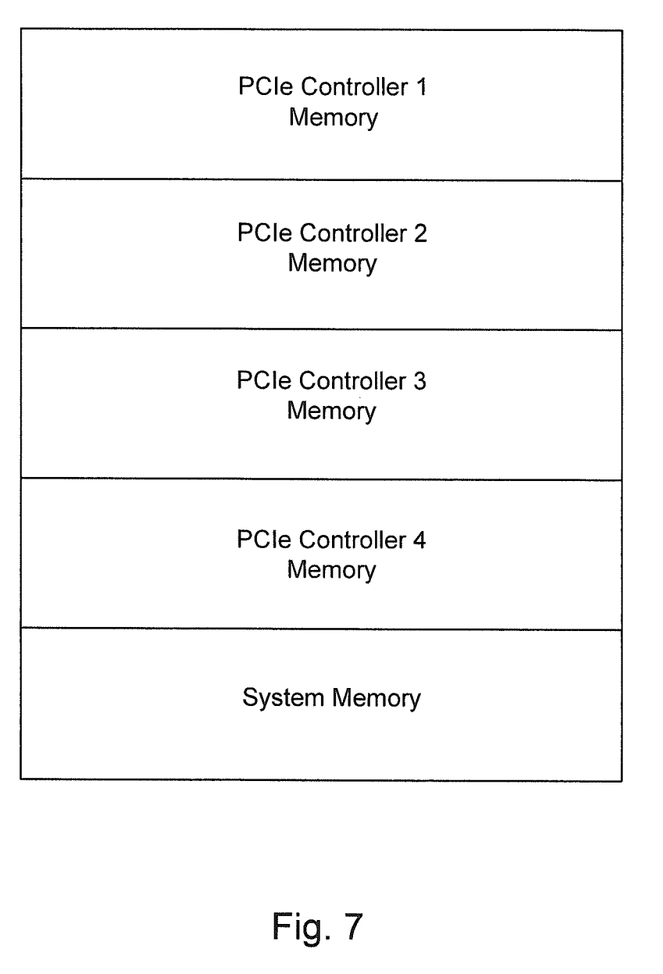
FIG. 7 illustrates an exemplary memory map of the high bandwidth controller.

In order to identify where the data is located in the memory controllers such that this data may be retrieved and/or replayed to the storage devices, the processor 270 maintains a memory map in the form of cache data structures. An exemplary map is set forth in FIG. 7. As shown, the memory map includes entries for each of the memory controllers as well as system memory. In effect, the memory modules of the memory controllers form a single cache for the storage controller. Once the data is ready to be transferred to the storage devices, the processor 270 sets up the drive IO processors with write commands and appropriate scatter gather lists and/or parity mapping algorithms such that the data, which may be split among one the memory modules of one or more memory controllers can be retrieved and replayed to its final destination. That is, the processor allows for sequentially writing data from multiple memory modules to a single data stream. During such a write, data is routed through the crossbar switch which connects the appropriate drive channel to the backend ingress/egress path 224 of the identified memory controller 220 such that the data may be transferred from the memory controller 220 to the specified storage device.

Figure 8:
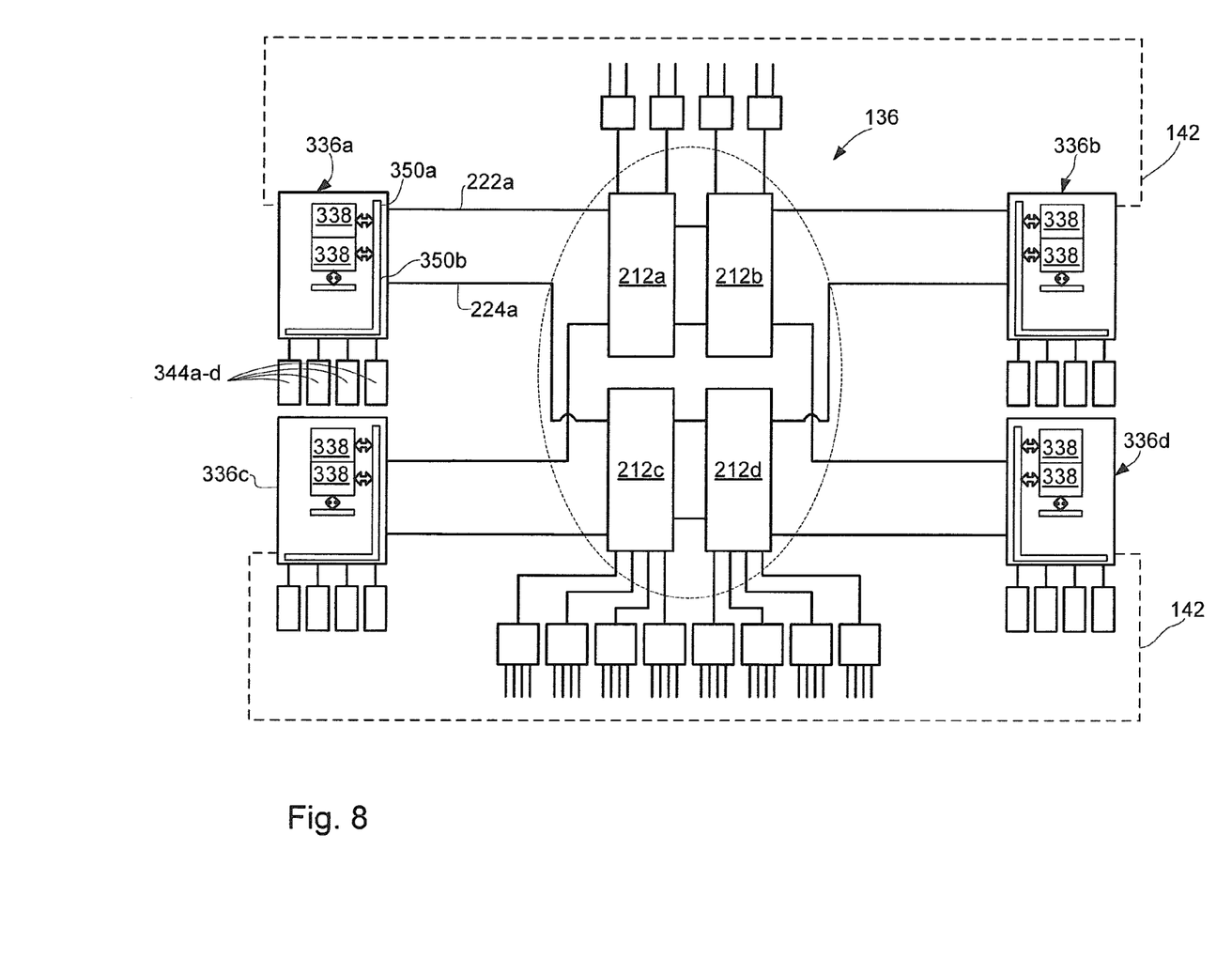
FIG. 8 illustrates another embodiment of a high bandwidth storage controller.

It will be appreciated that various alterations may be made to the disclosed storage controller. For instance, one or more of the memory controllers may include a processor/CPU core. In a specific embodiment, each of the FPGA memory controllers 220a-d may be replaced by a single socket CPU 336a-d (hereafter 336 unless specifically referenced) as illustrated in FIG. 8. In this embodiment, the single socket CPUs 336 is reconfigured to utilize its memory modules 344a-d and two of its PCIe paths 350a, 350b to connect to the front-end ingress/egress path 222 and back-end ingress/egress path 224, which are connected to the front-end PCIe switches and back end PCIe switches of the crossbar switch arrangement 210. In this particular embodment, the single socket CPUs 336 may each support custom code that allows the single socket CPUs to operate in a manner similar to the FPGA memory controllers discussed above. Further, in the illustrated embodiment, the processing core(s) 338 of one or more of the single socket CPUs 336 may replace the external processor discussed above. That is, one or more of the processing cores 338 may be utilized to manage data transfers for the controller 136. Additionally, one or more of the processing cores 338 may be utilized to provide other functions such as, for example, analytics, search functionality or alternative parity calculations. In one specific embodiment, the single socket processing cores 336 are either a Sandy Bridge or an Ivy Bridge processing complex.

It will be noted that while the storage controller is discussed above in relation to use with HPC systems, such a storage controller may be utilized in any application with high bandwidth needs. Additionally, for purposes of the disclosure, it will be noted that the term data as used herein includes a multiple bits, multiple bytes, multiple words, a block, a stripe, a file, a file segment, or other grouping of information. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

Various components of the presented system include computing devices that include software that perform some of the actions described herein. These computing devices may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the devices may include various specialized units, circuits, software and interfaces for providing the functionality and features described herein. The processes, functionality and features described herein may be embodied in whole or in part in software and/or may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed.

A computing device as used herein refers to any device with a processor, memory and a storage device that may execute instructions such as software including, but not limited to, server computers. The computing devices may run an operating system, including, for example, versions of the Lustre, Linux, UNIX, MS-DOS, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of SAS, Ethernet, INFINIBAND network, Fibre Channel, and others.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments. Consequently, variations and modifications commensurate with the above teachings, and skill and knowledge of the relevant art, are within the scope of the presented disclosure. It is intended that the appended claims be construed to include alternative embodiments to the extent permitted by the prior art.

What is claimed is:

1. A storage controller, comprising:
   four PCIe memory controllers, each having a PCIe front-end path, a PCIe back-end path and a set of memory modules;
   a PCIe crossover switch having:
      a front-end PCIe switch having a first plurality of PCIe lanes connected to one or more front-end PCIe host bus adaptors, said front-end host bus adaptors being connectable to one or more host paths, and a second plurality of PCIe lanes connected each of said PCIe front-end paths of said four PCIe memory controllers; and
      a back-end PCIe switch having a first plurality of PCIE lanes connected to one or more back-end PCIe host bus adaptors, said back-end host bus adaptors being connectable to one or more drive paths, and a second plurality PCIe lanes connected to each of said PCIe back-end paths of said four PCIe memory controllers.

2. The device of claim 1, further comprising a processor operative to schedule data into said memory modules of said four PCIe memory modules.

3. The device of claim 1, wherein a total number of PCIe lanes connected to each of said PCIe front-end paths is at least equal to a total number of PCIe lanes connected to any of said front-end PCIe host bus adaptors, wherein said front-end PCIe switch provides full bandwidth from any host path to any PCIe memory controller.

4. The device of claim 1, wherein any drive path of the back-end host bus adaptors is connectable to any host path of the front-end host bus adaptors via one of said four PCIe memory controllers.

5. The device of claim 1, wherein said front-end PCIe switch comprises:
   a fist set of first and second 96 lane PCIe switches, wherein each of said first and second 96 lane PCIe switches includes:
      32 PCIe lanes connected to one or more of said front-end PCIe host bus adaptors;
      16 PCIe lanes connected to first and second PCIex16 front-end paths of a unique set of two of said four PCIe memory controllers; and
      32 PCIE lanes connected to the other of the first set of first and second 96 lane PCIe switches.

6. The device of claim 5, wherein said back-end PCIe switch comprises:
   a second set of first and second 96 lane PCIe switches, wherein each of said first and second 96 lane PCIe switches includes:
      32 PCIe lanes connected to one or more of said back-end PCIe host bus adaptors;
      16 PCIe lanes connected to first and second PCIex16 back-end paths of a unique set of two of said four PCIe memory controllers; and
      32 PCIE lanes connected to the other of the second set of first and second 96 lane PCIe switches.

7. The device of claim 1, wherein each said four PCIe memory controller is operative to store data to said set of memory modules with parity.

8. The device of claim 7, wherein, each PCIe memory controller further comprises a data forking path, wherein data received by each said PCIe memory controller is copied to another PCIe memory controller.

9. The device of claim 1, wherein memory of said memory modules of said four PCIe memory controllers is presented in a PCIe memory space.

10. The device of claim 9, wherein said memory of said memory modules of said four PCIe memory controllers is further mapped into an address space of said processor.

11. The device of claim 1, wherein at least one of said four PCIe memory controllers comprises field programmable gate array (FPGA).

12. The device of claim 11, wherein said FPGA, further comprises:
   a PCIe controller; and
   PCIe registers.

13. The device of claim 1, wherein at least one of said PCIe memory controller comprises:
   a single socket CPU.

14. The device of claim 13, wherein a processing core of at least one of at least one said single socket CPUs comprises the processor operative to schedule data into said memory modules.

15. The device of claim 13, wherein said single socket CPUs comprise one of
   a Sandy Bridge processing complex; and
   an Ivy Bridge processing complex.

16. The device of claim 13, wherein said four PCIe memory controllers is a first set of four PCIe memory controllers and said PCIe crossover switch is a first PCIe crossover switch, further comprising:

a second set of four PCIe memory controllers, each having a PCIe front-end path, a PCIe back-end path and a set of memory modules;
   a second PCIe crossover switch having:
      a second front-end PCIe switch having a first plurality of PCIe lanes connected to one or more front-end PCIe host bus adaptors, said front-end host bus adaptors being connectable to one or more host paths, and a second plurality of PCIe lanes connected each of said PCIe front-end paths of said second set of four PCIe memory controllers; and
      a second back-end PCIe switch having a first plurality of PCIe lanes connected to one or more back-end PCIe host bus adaptors, said back-end host bus adaptors being connectable to one or more drive paths, and a second plurality of PCIe lanes connected to each of said PCIe back-end paths of said second set of four PCIe memory controllers.

17. The device of claim 16, wherein, a data forking path of each of said first set of four PCIe memory controllers is connected to a data forking path of one of said second set of four PCIe memory controllers.

\* \* \* \* \*